United States Patent

Mennicke et al.

[11] Patent Number: 5,503,666
[45] Date of Patent: Apr. 2, 1996

[54] DYESTUFFS AND THEIR USE IN INKS FOR INK-JET PRINTING PROCESSES

[75] Inventors: Winfried Mennicke, Leverkusen; Karin Hassenrück, Düsseldorf, both of Germany

[73] Assignee: Bayer Aktiengesellschaft, Leverkusen, Germany

[21] Appl. No.: 418,976

[22] Filed: Apr. 7, 1995

[30] Foreign Application Priority Data

Apr. 15, 1994 [DE] Germany .................. 44 13 007.4

[51] Int. Cl.$^6$ .................. C09D 11/00; C09B 69/10
[52] U.S. Cl. .................. 106/22 H; 106/22 K; 106/22 D; 534/593; 549/388
[58] Field of Search .................. 106/22 R, 22 D, 106/22 H, 22 K; 534/593; 544/122, 347, 3, 63; 522/101; 549/388

[56] References Cited

U.S. PATENT DOCUMENTS

| | | | |
|---|---|---|---|
| 3,716,525 | 2/1973 | Engelhardt et al. | 260/128 |
| 3,937,851 | 2/1976 | Bellanca et al. | 426/540 |
| 4,230,852 | 10/1980 | Sueda et al. | 544/189 |
| 4,962,190 | 10/1990 | Mayer et al. | 106/22 K |
| 5,074,884 | 12/1991 | Mennicke et al. | 8/436 |
| 5,268,457 | 12/1993 | Tzikas | 534/618 |

FOREIGN PATENT DOCUMENTS

| | | |
|---|---|---|
| 0223501 | 5/1987 | European Pat. Off. . |
| 1325615 | 8/1973 | United Kingdom . |
| 2006279 | 5/1979 | United Kingdom . |

OTHER PUBLICATIONS

*Chemical Abstracts*, vol. 81, abstract No. 84:19163, abstract of JP 50–10, 277 (no month) (1976).
Derwent Abstract of 59–27,973 (1984), no month available.
Derwent Abstract of JP 59–08,775 (1984), no month available.

*Primary Examiner*—Helene Klemanski
*Attorney, Agent, or Firm*—Sprung Horn Kramer & Woods

[57] ABSTRACT

Novel dyestuffs have been found which are obtainable by reacting

A) polyamines containing at least 2 primary or secondary amino groups with

B) reactive compounds containing at least two groups which are reactive towards primary and secondary amines in an amount of 5 to 95 mol %, relative to the primary and secondary amino groups of the polyamine, and C) dyestuffs containing at least one acylatable primary or secondary amino group in an amount of 10 to 200 mol %, relative to the reactive compound, and D) carbonyl- or sulphonyl-containing acylating agents in an amount of 5 to 95 mol %, relative to the primary and secondary amino groups of the polyamine and can be used in particular for coloring and printing cellulose-/amido-containing materials and as recording fluids for ink-jet recording systems.

16 Claims, No Drawings

DYESTUFFS AND THEIR USE IN INKS FOR INK-JET PRINTING PROCESSES

The present invention relates to water-soluble dyestuffs which are covalently bonded to acylated polyamines and to their use for dyeing and printing cellulose- and amido-containing materials and in recording fluids for ink-jet recording systems.

Dyestuffs which are covalently bonded to polyamines are known and described, for example, in the patent literature DE-A-2,425,283, DE-A-2,747,358, JP-A-50/107,277, JP-A-59/08,775, DE-A-2,018,855, U.S. Pat No. 3,937,851, U.S. Pat. No. 5,098,475 or JP-A-59/27,973. However, such dyestuffs containing polyamino groups possess in many cases insufficient water solubility especially below a pH of 9. If, for example, these dyestuffs are used in aqueous recording fluids for ink-jet recording systems, precipitations and blocking of the sensitive printer nozzles may occur. It has now been found that the water solubility of these dyestuffs and thus the stability of recording fluids prepared therefrom can be significantly improved by acylating one or more amine groups of the polyamine.

Novel dyestuffs have now been found which are obtainable by reacting

A) polyamines containing at least 2 primary or secondary amino groups with

B) reactive compounds containing at least two groups which are reactive towards primary and secondary amines in an amount of 5 to 95 mol %, relative to the primary and secondary amino groups of the polyamine, and C) dyestuffs containing at least one acylatable primary or secondary amino group in an amount of 10 to 200 mol %, relative to the reactive compound, and D) carbonyl- or sulphonyl-containing acylating agents in an amount of 5 to 95 mol %, relative to the primary and secondary amino groups of the polyamine.

Of these, those dyestuffs are preferred in which dyestuff C) is in each case bonded to reactive compound B).

Particularly preferred dyestuffs are those in which in addition the acylating agent D) is bonded to the polyamine A).

Preference is given to dyestuffs which are obtainable by using, as polyamines A), those of the formula (I)

$$HN-R_1-NH \quad (I)$$
with $R_2$ and $R_3$ substituents in which $R_1$ is linear or branched $C_2$–$C_{20}$-alkylene, unsubstituted or $C_1$–$C_4$-alkyl-substituted $C_6$–$C_{10}$-arylene, 2 or more $C_6$–$C_{10}$-arylene units which are unsubstituted or substituted by $C_1$–$C_4$-alkyl and my be interrupted by $C_1$–$C_4$-alkylene, linear or branched $C_2$–$C_{20}$-aliphatic units interrupted by (n-1) amino groups where n is 2 to 25,000, it being possible for the radicals given as meanings for $R_1$ to contain amino groups, $R_2$ and $R_3$, independently of one ether, are hydrogen, $C_1$–$C_{10}$-alkyl, $C_6$–$C_{10}$-aryl or together form a $C_2$–$C_{10}$-alkylene or $C_6$–$C_{10}$-arylene unit.

Particular preference is given to dyestuffs which are obtainable by using at least one of the polyamines below:

a) diamines of the formula (II)

$$H_2N-R-NH_2 \quad (II),$$

in which $R$ represents $C_2$–$C_9$-alkylene or a divalent radical of the formula

[structures with phenyl rings bearing $(CH_3)_y$ groups and $(CH_2)_u$, $(CH_2)_v$, or $(CH_2)_y$ linkers]

or

[structure of two phenyl rings with $(CH_3)_y$ substituents and $(CH_2)_y$ linker]

in which
u represents 1 or 2,
v represents 0 or 1 and
y represents 1, 2 or 3 b) piperazines of the formula $$HN\diagup\diagdown NH, \quad HN\diagup\diagdown N-CH_2CH_2NH_2,$$

$$H_2N-CH_2CH_2-N\diagup\diagdown N-CH_2CH_2-NH_2$$

c) polyamines of the formula (III)

$$HN\begin{Bmatrix}[CH_2-CH(R_4)-(CH_2)_q-NH]_s-H\\ [CH_2-CH(R_5)-(CH_2)_r-NH]_t-H\end{Bmatrix} \quad (III)$$

in which $R_4$, $R_5$, independently of one another, represent hydrogen, methyl or ethyl, q, r, independently of one another, represent 0, 1, 2, 3 or 4 and s, t, independently of one another, represent 1, 2, 3, 4, 5 or 6, d) polyamines obtainable by polymerization of $C_2$–$C_{10}$-alkyleneimines, e) polyamines obtainable by polymerization of unsaturated aliphatic $C_3$–$C_{10}$-amines in which the amino group is in the allyl position or aromatic $C_6$–$C_{10}$-amines carrying unsaturated aliphatic radicals whose double bond is conjugated with the aromatic system, f) polyamines obtainable by the condensation of polyamines of the formula (III) with aliphatic $C_2$–$C_{10}$-dihalides.

Examples of polyamines d) include polyamines such as are formed in the polymerization of ethyleneimine, for example polyethyleneamines having a degree of polymerization of 10 to 25,000.

Polyamines f) are preferably obtained by condensation of 1,2-dichloro- or 1,2-dibromoethane with polyamines of the formula (III).

Preferably, polyamines e) include those obtainable by polymerization of compounds such as allylamine, diallylamine, methyl-, ethyl-, propylaminoethylstyrene or aminostyrene.

Reactive compound B) is derived from an aliphatic, araliphatic, aromatic or heteroaromatic compound and contains at least two reactive groups which are capable of forming covalent bonds with primary and secondary nucleophilic amino groups or nucleophilic aromatic C atoms.

Particularly preferred dyestuffs are obtainable by using, as reactive compounds B), those containing, independently of one ether, at least one of the following radicals:

—SO₂—A,
—SO₂—CH₂CH₂—A,
—SO₂NH—CH₂CH₂—A,

—CO—A,
—CO—CH₂CH₂A,
—NHCO—CH₂CH₂—A,

—SO₂—CH=CH₂,
—CONH—CH₂—A,
—CH₂—CH—CH₂—A,
         |
         OH

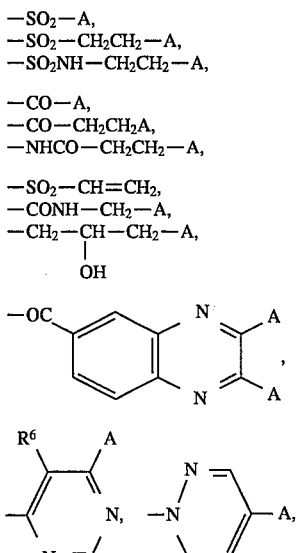

where R⁶ = H, Cl, CH₃, CN

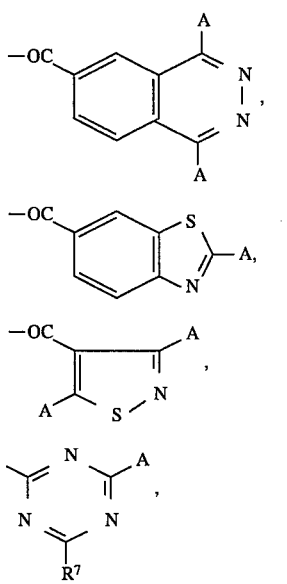

where R⁷ = NH₂, HN—⟨phenyl⟩—(SO₃H),

OCH₃ or OCH₂CH₂OCH₃ and preferably a radical of the formula

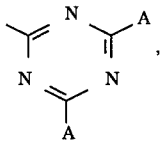

in which

A represents a leaving group and denotes, for example, Cl, F, OSO₃H, N(CH₃)₃, SO₂CH₃, OPO₃H or SO₂C₂H₅.

The mono- or polyfunctional radicals with respect to primary and secondary amines mentioned in the above list are referred to in dyestuff chemistry as reactive group or "reactive hook".

As used in this application, reactive compounds B) are in particular heteroaromatic reactive groups, preferably halogenotriazines, such as cyanuric chloride, cyanuric fluoride or cyanuric bromide, and halogenopyrimidines, and the like.

The reactive compounds can also be reactive dyestuffs per se or precursors thereof provided with reactive radicals.

Specifically, the reactive compounds C) can also contain the following radicals:

2,4-difluoro-6-triazinyl, 2,4-dichloro-6-triazinyl, symmetrical mono-halogen-o-triazinyl radicals, in particular monochloro- and monofluorotriazinyl radicals, substituted by alkyl, aryl, amino, monoalkylamino, piperidino, pyrrolidino, piperazino, alkoxy, aryloxy, alkylthio, arylthio, where alkyl preferably denotes substituted or unsubstituted $C_1$–$C_4$-alkyl, aralkyl preferably denotes substituted or unsubstituted phenyl-$C_1$–$C_4$-alkyl, and aryl preferably denotes substituted or unsubstituted phenyl or naphthyl and where halogen, hydroxyl, cyano, vinylsulphonyl, substituted alkylsulphonyl, dialkylamino, morpholino, $C_1$–$C_4$-alkoxy, vinylsulphonyl-$C_2$–$C_4$-alkoxy, substituted alkylsulphonyl-$C_2$–$C_4$-alkoxy, carboxyl, sulpho or sulphato are preferred substituents for alkyl and sulpho, $C_1$–$C_4$-alkyl, $C_1$–$C_4$-alkoxy, carboxyl, halogen, acylamino, vinylsulphonyl, substituted alkylsulphonyl, hydroxyl, amino are preferred substituents for phenyl and naphthyl.

Specifically, the following radicals may be mentioned: 2-Amino-4-fluoro-6-triazinyl, 2-methylamino-4-fluoro-6-triazinyl, 2-ethylamino-4-fluoro-6-triazinyl, 2-isopropylamino-4-fluoro-6-triazinyl, 2-dimethylamino-4-fluoro-6-triazinyl, 2-diethylamino-4-fluoro-6-triazinyl, 2-β-methoxyethylamino-4-fluoro-6-triazinyl, 2-β-hydroxyethylamino-4-fluoro-6-triazinyl, 2-di-(β-hydroxyethylamino)-4-fluoro-6-triazinyl, 2-di-(β-hydroxyethylamino)-4-fluoro-6-triazinyl, 2-β-sulphoethylamino-4-fluoro-6-triazinyl, 2-β-sulphoethylmethylamino-4-fluoro-6-triazinyl, 2-carboxymethylamino-4-fluoro-6-triazinyl, 2-di-(carboxymethylamino)-4-fluoro-6-triazinyl, 2-sulphomethyl-methylamino-4-fluoro-6-triazinyl, 2-β-cyanoethylamino-4-fluoro-6-triazinyl, 2-benzylamino-4-fluoro-6-triazinyl, 2-β-phenylethylamino-4-fluoro-6-triazinyl, 2-benzyl-methylamino-4-fluoro-6-triazinyl, 2-(4'-sulphobenzyl)-amino-4-fluoro-6-triazinyl, 2-cyclohexylamino-4-fluoro-6-triazinyl, 2-(o-, m-, p-methylphenyl)-amino-4-fluoro-6-triazinyl, 2-(o-, m-, p-sulphophenyl)-amino-4-fluoro-6-triazinyl, 2-(2', 5'-disulphophenyl)-amino-4-fluoro-6-triazinyl, 2-(o-, m-, p-chlorophenyl)-amino-4-fluoro-6-triazinyl, 2-(o-, m-, p-methoxyphenyl)-amino-4-fluoro-6-triazinyl, 2-(2'-methyl-4'-sulphophenyl)-amino-4-fluoro-6-triazinyl, 2-(2'-methyl-5'-sulphophenyl)-amino-4-fluoro-6-triazinyl, 2-(2'-chloro-4'-sulphophenyl)-amino-4-fluoro-6-triazinyl, 2-(2'-chloro-5'-sulphophenyl)-amino-4-fluoro-6-triazinyl, 2-(2'-methoxy-4'-sulphophenyl)-amino-4-fluoro-6-triazinyl, 2-(o-, m-, p-carboxyphenyl)-amino-4-fluoro-6-triazinyl, 2-(2', 4'-disulphophenyl)-amino-4-fluoro-6-triazinyl, 2-(3', 5'-disulphophenyl)-amino-4-fluoro-6-triazinyl, 2-(2'-carboxy-4'-sulphophenyl)-amino-4-fluoro-6-triazinyl, 2-(2'-carboxy-5'-sulphophenyl)-amino-4-fluoro-6-triazinyl, 2-(6'-sulpho-2'-naphthyl)-amino-4-fluoro-6-triazinyl, 2-(4', 8'-disulpho-2'-naphthyl)-amino-4-fluoro-6-triazinyl, 2-(6'8'-disulpho-2'-naphthyl)-amino-4-fluoro-6-triazinyl, 2-(N-methyl-N-phenyl)-amino-4-fluoro-6-triazinyl, 2-(N-ethyl-N-phenyl)-amino-4-fluoro-6-triazinyl, 2-(N-β-hydroxyethyl-N-phenyl)-amino-4-fluoro-6-triazinyl, 2-(N-iso-propyl-N-phenyl)-amino-4-fluoro-6-triazinyl, 2-morpholino-4-fluoro-6-triazinyl, 2-piperidino-4-fluoro-6-triazinyl, 2-(4', 6', 8'-trisulpho-2'-naphthyl)-amino-4-fluoro-6-triazinyl, 2-(3', 6', 8'-trisulpho-2'-naphthyl)-amino-4-fluoro-6-triazinyl, 2-(3', 6'-disulpho-1'-naphthyl)-amino-4-fluoro-6-triazinyl, N-methyl-N-(2,4-dichloro-6-triazinyl)-carbamyl, N-methyl-N-(2-methylamino-4-chloro-6-triazinyl)-carbamyl, N-methyl-N-( 2-dimethylamino-4-chloro-6-triazinyl)-carbamyl, N-methyl- and N-ethyl-N-(2,4-dichloro-6-triazinyl)-aminoacetyl, 2-methoxy-4-fluoro-6-triazinyl, 2-ethoxy-4-fluoro-6-triazinyl, 2-phenoxy-4-fluoro-6-triazinyl, 2-(o-, m- or p-sulphophenoxy)-4-fluoro-6-triazinyl, 2-(o-, m- or p-methyl- or -methoxyphenoxy)-4-fluoro-6-triazinyl, 2-β-hydroxyethylmercapto-4-fluoro-6-triazinyl, 2-phenylmercapto-4-fluoro-6-triazinyl, 2-(4'-methylphenyl)-mercapto-4-fluoro-6-triazinyl, 2-(2', 4'-dinitrophenyl)-mercapto-4-fluoro-6-triazinyl, 2-methyl-4-fluoro-6-triazinyl, 2-phenyl-4-fluoro-6-triazinyl and the corresponding 4-chloro- and 4-bromo-triazinyl radicals and the corresponding radicals obtainable by halogen exchange with tertiary bases, such as trimethylamine, triethylamine, dimethyl-β-hydroxyethylamine, triethanolamine, N,N-dimethylhydrazine, pyridine, α-, β- or γ-picoline, nicotinic acid or isonicotinic acid, sulphinates, in particular benzenesulphinic acids or hydrogen sulphite.

Mono-, di- or trihalogenopyrimidinyl radicals, such as 2,4-dichloro-6-pyrimidinyl, 2,4,5-trichloro-6-pyrimidinyl, 2,4-dichloro-5-nitro- or -5-methyl-or-5-thiomethyl- or -5-thiomethyl- or -5-carboxymethyl- or -5-carboxy- or -5-cyano- or -5-vinyl- or 5-sulpho- or -5-mono-, -di- or -trichloromethyl- or -5-carbalkoxy-6-pyrimidinyl, 2,6-dichloropyrimidine-4-carbonyl, 2,4-dichloropyrimidine-5-carbonyl, 2-chloro-4-methyl-pyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-dichloropyrimidine-5-sulphonyl, 2-chloroquinoxaline-3-carbonyl, 2- or 3-monochloroquinoxaline-6-carbonyl, 2- or 3-monochloroquinoxaline-6-sulphonyl, 2,3-dichloroquinoxaline-5- or -6-carbonyl, 2,3-dichloroquinoxaline-5- or -6-sulphonyl, 1,4-dichlorophthalazine-6-sulphonyl or -6-carbonyl, 2,4-dichloroquinoxaline-7- or -6-sulphonyl or -carbonyl, 2-or 3- or 4-(4', 5'-dichloro-6'-pyridazon-1-yl)phenylsulphonyl or -carbonyl, β-(4', 5'-dichloro-6'-pyridazon-1'-yl)-ethyl-carbonyl, N-methyl-N-(2,3-dichloroquinoxaline-6-sulphonyl)-aminoacetyl, N-methyl-N-(2,3-dichloroquinoxaline-6-carbonyl)-aminoacetyl, and the corresponding bromine and fluorine derivatives of the abovementioned chloro-substituted heterocyclic radicals, of these, for example, 2-fluoro-4-pyrimidinyl, 2,6-difluoro-4-pyrimidinyl, 2,6-difluoro-5-chloro-4-pyrimidinyl, 2-fluoro-5,6-dichloro-4-pyrimidinyl, 2,6-difluoro-5-methyl-4-pyrimidinyl, 2,6-difluoro-5-thiomethyl-4-pyrimidinyl, 2-fluoro-5-methyl-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 5-chloro-6-dichloromethyl-2-fluoro-4-pyrimidinyl, 5-chloro-6-dichloromethyl-2-fluoro-4-pyrimidinyl, 5-chloro-2-chloromethyl-6-fluoro-4-pyrimidinyl, 5-chloro-2-dichloromethyl-6-fluoro-4-pyrimidinyl, 5-chloro-2-trichloromethyl- 6-fluoro-4-pyrimidinyl, 5-chloro-2-fluorodichloromethyl-6-fluoro-4-pyrimidinyl, 2,6-difluoro-5-bromo-4-pyrimidinyl, 2-fluoro-5-bromo-6-methyl-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 2-fluoro-5-nitro-4-pyrimidinyl, 2-fluoro-5-trifluoro-methyl-4-pyrimidinyl, 2-fluoro-5-phenyl- or-5-methylsulphonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 5-chloro-6-fluoro-2-methyl-4-pyrimidinyl, 5,6-difluoro-2-trifluoromethyl-4-pyrimidinyl, 5-chloro-6-fluoro-2-dichlorofluoromethyl-4-pyrimidinyl, 2-fluoro-5-chloropyrimidin-4-yl, 2-methyl-4-fluoro-5-methylsulphonyl -6-pyrimidinyl, 2,6-difluoro-5-methyl-sulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbomethoxy-4-pyrimidinyl, 2,6-difluoro-5-trifluoromethyl-4-pyrimidinyl; sulphonyl-containing triazine radicals, such as 2,4-bis-(phenylsulphonyl)-6-triazinyl, 2-(3'-carboxyphenyl)sulphonyl-4-chloro-6-triazinyl, 2-(3'-sulphophenyl)sulphonyl-4-chloro-6-triazinyl, 2,4-bis-(3'-carboxyphenylsulphonyl)-6-triazinyl; sulphonyl-containing pyrimidine rings, such as 2-carboxymethylsulphonyl-4-pyrimidinyl, 2-methylsulphonyl-6-methyl-4-pyrimidinyl, 2-methylsulphonyl-6-ethyl-4-pyrimidinyl, 2-phenylsulphonyl-4-pyrimidinyl, 2,6-bis(methylsulphonyl)-5-chloro-4-pyrimidinyl, 2,4-bis(methylsulphonyl)-pyrimidine-5-sulphonyl, 2-methylsulphonyl-4-pyrimidinyl, 2-phenylsulphonyl-4-pyrimidinyl, 2-tri-chloromethylsulphonyl-6-methyl-4-pyrimidinyl, 2-methylsulphonyl-5-chloro-6-methyl-4-pyrimidinyl, 2-methylsulphonyl-5-bromo-6-methyl-4-pyrimidinyl, 2-methylsulphonyl-5-chloro-6-ethyl-4-pyrimidinyl, 2-methylsulphenyl-5-chloro-6-chloromethyl-4-pyrimidinyl, 2-methylsulphonyl-4-chloro-6-methylpyrimidin-5-sulphonyl, 2-methylsulphonyl-5-nitro-6-methyl-4-pyrimidinyl, 2,5,6-tris(methylsulphonyl)-4-pyrimidinyl, 2-methylsulphonyl-5, 6-dimethyl-4-pyrimidinyl, 2-fluoro-6-carboxamido-4-pyrimidinyl, 2-fluoro-6-carbomethoxy-4-pyrimidinyl, 2-fluoro-6-phenyl-4-pyrimidinyl, 2-fluoro-6-cyano-4-pyrimidinyl, 5-chloro-6-fluoro-2-methyl-4-pyrimidinyl, 5,6-difluoro-2-trifluoromethyl-4-pyrimidinyl, 5-chloro-6-fluoro-2-dichlorofluoromethyl-4-pyrimidinyl, 2-fluoro-5-chloropyrimidin-4-yl, 2-methyl-4-fluoro-5-methylsulphonyl-6-pyrimidinyl, 2,6-difluoro-5-methylsulphonyl-4-pyrimidinyl, 2,6-dichloro-5-methylsulphonyl-4-pyrimidinyl, 2-fluoro-5-sulphonamido-4-pyrimidinyl, 2-fluoro-5-chloro-6-carbomethoxy-4-pyrimidinyl, 2,6-difluoro-5-trifluoromethyl-4-pyrimidinyl; sulphonyl-containing triazine radicals, such as 2,4-bis(phenylsulphonyl)-6-triazinyl, 2-(3'-carboxyphenyl)-sulphonyl- 4-chloro-6-triazinyl, 2-(3'-sulphophenyl)sulphonyl-4-chloro-6-triazinyl, 2,4-bis-(3'-carboxyphenylsulphonyl)-6-triazinyl; sulphonyl-containing pyrimidine rings, such as 2-carboxymethylsulphonyl-4-pyrimidinyl, 2-methylsulphonyl-6-methyl-4-pyrimidinyl, 2-methylsulphonyl-6-ethyl-4-pyrimidinyl, 2-phenylsulphonyl-5-chloro-6-methyl-4-pyrimidinyl, 2,6-bis(methylsulphonyl)-4-pyrimidinyl, 2,6-bis(methylsulphonyl)-5-chloro-4-pyrimidinyl, 2,4-bis(methylsulphonyl)-pyrimidine-5-sulphonyl, 2-methylsulphonyl-4-pyrimidinyl, 2-phenylsulphonyl-4-pyrimidinyl, 2-trichloromethylsulphonyl-6-methyl-4-pyrimidinyl, 2-methylsulphonyl-5-chloro-6-methyl-4-pyrimidinyl, 2-methylsulphonyl-5-bromo-6-methyl-4-pyrimidinyl, 2-methylsulphonyl-5-chloro-6-ethyl-4-pyrimidinyl, 2-methylsulphonyl-5-chloro-6-chloromethyl-4-pyrimidinyl, 2-methylsulphonyl-4-chloro-6-methylpyrimidine-5-sulphonyl, 2-methylsulphonyl-5-nitro-6-methyl-4-pyrimidinyl, 2,5,6-tris(methylsulphonyl)-4-pyrimidinyl, 2-methylsulphonyl-5,6-dimethyl-4-pyrimidinyl, 2-ethylsulphonyl-5-chloro-6-methyl-4-pyrimidinyl, 2-methylsulphonyl-6-chloro-4-pyrimidinyl, 2,6-bis(methylsulphonyl)-5-chloro-4-pyrimidinyl, 2-methylsulphonyl-6-carboxy-4-pyrimidinyl, 2-methylsulphonyl-5-sulpho-4-pyrimidinyl, 2-methylsulphonyl-6-carboxymethoxy-4-pyrimidinyl, 2-methylsulphonyl-5-carboxy-4-pyrimidinyl, 2-methylsulphonyl-5-cyano-6-methoxy-4-pyrimidinyl, 2-methylsulphonyl-5-chloro-4-pyrimidinyl, 2-β-sulphoethyl-sulphonyl-6-methyl-4-pyrimidinyl, 2-methylsulphonyl-5-bromo-4-pyrimidinyl, 2-phenylsulphonyl- 5-chloro-4-pyrimidinyl, 2-carboxymethylsulphonyl-5-chloro-6-methyl -4-pyrimidinyl, 2-methylsulphonyl-6-chloropyrimidine-4-and-5-carbonyl, 2,6-bis(methylsulphonyl)-pyrimidine-4- or -5-carbonyl, 2-ethylsulphonyl-6-chloropyrimidine-5-carbonyl, 2,4-bis(methylsulphonyl)-pyrimidine-5-sulphonyl or -carbonyl; 2-chlorobenzothiazole-5- or -6-carbonyl or -5- or -6-sulphonyl, 2-arylsulphonyl- or alkylsulphonylbenzothiazole-5- or -6-carbonyl or -5- or -6-sulphonyl, such as 2-methylsulphonyl- or 2-ethylsulphonylbenzothiazole-5- or -6-sulphonyl or -carbonyl, 2-phenylsulphonylbenzothiazole-5- or -6-sulphonyl or -carbonyl and the corresponding 2-sulphonylbenzothiazole-5- or -6-carbonyl or -sulphonyl derivatives containing sulpho groups in the fused-on benzene ring, 2-chlorobenzole-5- or -6-carbonyl or -sulphonyl, 2-chloro-1-methylbenzimidazole-5- or - 6-carbonyl or -sulphonyl, 2-chloro-4-methyl-1,3-thiazole-5-carbonyl or -4- or -5-sulphonyl, the N-oxide of 4-chloro- or 4-nitroquinoline-5-carbonyl.

Dyestuffs which are also preferred are obtainable if the dyestuffs C) used are phthalocyanine, nitroaryl, triphenylmethane, oxazine, triphendioxazine, phenazine, stilbene, thiazine or xanthene dyestuffs, but especially anthraquinone, monoazo, disazo and polyazo dyestuffs and furthermore metal complex dyestuffs, such as 1:1 nickel complexes, 1:1 copper complexes or 1:1 chromium complexes, 1:2 cobalt complexes or symmetrical or unsymmetrical 1:2 chromium complexes containing a metal-complexing o,o'-dihydroxy-, o-hydroxy-o'-amino- or o-carboxy-o'-hydroxy-azo- or -azomethine structure.

Preferably, dyestuffs C) are derived from the water-soluble dyestuffs of the abovementioned chromophore systems carrying, as water-solubilizing group, independently of one another, one or more sulphonamide groups, sulphonamide groups which are mono- or disubstituted on the nitrogen by alkyl, alkylsulphonyl, carboxyl, carboxylate or sulphonate groups. Preferred alkyl groups are methyl, ethyl or hydroxyethyl. Suitable counter ions of the anionic groups are alkali metal ions, in particular lithium ions, sodium ions or potassium ions, ammonium ions or cations of organic amines, in particular ammonium ions mono-, di-, tri- or tetrasubstituted by lower alkyl.

As used here, water-soluble dyestuffs are dyestuffs carrying water-solubilizing groups, as mentioned above, or dyestuffs which in general have a solubility of greater than 10 g of dyestuff/1 l of water at a temperature of 25° C.

In a particular embodiment, reactive compound B) and dyestuff C) together are represented by a reactive dyestuff containing at least one group which is reactive towards primary and secondary amines.

Dyestuffs which are furthermore preferred are obtainable by using, as the carbonyl- or sulphonyl-containing acylating agent D) carbonylhalides, carboxylic esters or anhydrides, halogenoformates, isocyanates or sulphonyl halides, sulphonic esters or anhydrides or isothiocyanates.

Examples include:

propionyl chloride, propionyl bromide, ethyl propionate, propionic anhydride, ethyl chloroformate or ethyl isocyanate.

Preferred acylating agents D) are also carboxylic anhydrides, preferably maleic anhydride, succinic anhydride, glutaric anhydride, acetic anhydride or phthalic anhydride.

The invention also provides a process for preparing the dyestuffs according to the invention.

To prepare the dyestuffs according to the invention starting from dyestuffs C), reactive compounds B), polyamines A) and acylating agents D), basically three reaction steps are required whose sequence can be changed as desired.

Thus, for example, the di- or, if desired, trifunctional reactive compound can-be attached only at one function to an and no group of the polyamine under mild conditions and then reacted with the nucleophilic amino-containing dyestuff under conditions which preferably involve higher temperatures than were necessary in the first acylation step, and the resulting reaction product can then be acylated.

However, in a preferred process variant, the reactive dyestuffs (i.e., dyestuffs C) which have already been reacted with the reactive compound B) to give reactive dyestuffs) are first reacted with the polyamines and then with the acylating agent mentioned. It is also possible and advantageous to react the polyamines with the acylating agent in a first reaction step and only then to react the resulting product with a reactive dyestuff.

The reactive dyestuffs to be used are derived from the dyestuffs C) described above and contain, as reactive group, those radicals already mentioned for the reactive compound B).

In the case where amino-containing dyestuffs and reactive compounds are not used in the form of the already completed reactive dyestuff, the condensation to give the reactive dyestuff can preferably be carried out in an aqueous medium at temperatures of 0° to 60° C., and the acids released during the reaction can, if desired, be scavenged by alkaline agents.

Examples of suitable alkaline agents are the hydroxides, carbonates and bicarbonates of alkali metals, such as lithium hydroxide, sodium hydroxide or potassium hydroxide, lithium carbonate, sodium carbonate or potassium carbonate or lithium bicarbonate, sodium bicarbonate or potassium bicarbonate, ammonia or ammonium hydroxide, mono-, di-, tri- or tetrasubstituted by lower alkyl, such as mono-, di- or triethylammonium hydroxide, mono-, di- or tris(2-hydroxyethyl) ammonium hydroxide or tetramethylammonium hydroxide, or pyridine bases, such as pyridine, picoline or choline.

The abovementioned reactive dyestuffs are preferably those containing one or more fibre-reactive radicals. Many of such fibre-reactive dyestuffs are described in the literature and are available in large numbers as commercial products. A list of fibre-reactive commercial products can be found, for example, in "Colour Index", 3rd Ed. (4th Revision, 1992), Vol. 9, pp. 5151–5168.

Preferred reactive dyestuffs for preparing the dyestuffs according to the invention are those containing only one fibre-reactive group and forming a chemical bond as a result of addition or substitution reactions with primary and secondary amino groups in, preferably, an aqueous medium under neutral to weakly alkaline conditions at temperatures of 20° to 80° C. The primary and/or secondary amino groups in the polyamine need not have undergone a complete stoichiometric reaction with reactive dyestuffs and acylating agent. Thus, for example, the molar ratio of reactive dyestuff or reactive compound to acylating agent my vary within the limits of 1:0.3 to 1:3.0. The molar ratio of reactive dyestuff to be used or of reactive compound to primary and secondary amino groups in the polyamine is preferably variable within the limits of 1:1.05 to 1:20, in particular 1:2 to 1:10, this ratio being preferably understood as meaning the ratio of reactive groups of the reactive dyestuff to primary and secondary amino groups in the polyamine. The molar ratio of acylating agent to primary and secondary amino groups in the polyamine is also preferably 1:1.05 to 1:20, particular 1:2 to 1:10.

After synthesis of the dyestuffs according to the invention is complete, a solution is usually obtained from which the dyestuffs can be isolated by concentrating or salting out and worked up in the usual manner to give powder or liquid finishes.

The invention furthermore relates to dyestuffs obtainable by reaction of

A1) polyamines which in turn are obtainable by polymerization of unsaturated aliphatic $C_3$–$C_{10}$-amines in which the amino group is in the allyl position, in particular allylamine or diallylamine, or aromatic amines carrying unsaturated aliphatic radicals which are conjugated with the aromatic system, in particular methyl-, ethyl- or propylaminoethylstyrene or aminostyrene, with B) reactive compounds containing at least two groups which are reactive towards primary and secondary amines in an amount of 5 to 95 mol %, relative to the primary and secondary amino groups of the polyamine, and C) dyestuffs containing at least one acylatable primary or secondary amino group in an amount of 10 to 200 mol %, relative to the reactive compound, in which dyestuff C) is in each case bonded to the reactive compound B).

What has been said above with respect to reactive compound B) and dyestuff C) also applies here.

These dyestuffs too are preferably obtained as described above by using reactive dyestuffs instead of by successfully using the individual components B) and C).

These (non-polyamine-acylated) dyestuffs too are according to the invention and advantageous. As used hereinafter, the term dyestuffs "according to the invention" thus means both types of dyestuffs.

The dyestuffs according to the invention dye cellulose- and amido-containing materials, in particular paper, cotton, viscose and leather not only in the form of solid but also in the form of liquid preparations and produce dyeings having good wet and light fastness. They are particularly suitable for preparing recording fluids for ink-jet printing processes, for example in conjunction with bubble-jet or piezoelectric printing systems.

When preparing recording fluids, no intermediate isolation of the dyestuffs according to the invention is necessary. The solution or, in some cases, suspensions obtained during the synthesis can be desalted directly using membrane separation methods while being concentrated and freed from low-molecular-weight by-products and then converted into a finish suitable for ink-jet printing processes, if appropriate with the addition of water-soluble organic solvents, hydrotropic auxiliaries and further conventional additives.

A suitable membrane separation method is permeation under pressure on semi-permeable membranes. It can be performed as reverse osmosis, ultra- or nanofiltration or by combination of these methods. The preferred method is ultrafiltration using membranes which are permeable to salts and compounds having a molecular weight of less than about 20,000 daltons.

Suitable organic solvents and hydrotropic agents are mono- and polyhydric alcohols and ethers and esters thereof, nitriles, carboxamides, cyclic amides, ureas and esters, sulphones and sulphoxides. Examples of particularly suitable solvents are methanol, ethanol, propanol, ethylene glycol and its monomethyl ether, -ethyl ether and -propyl ether, 1,2-propylene glycol, 1-methoxy- and 1-ethoxy-2-propanol, 2-methoxy- and 2-ethoxy-1-propanol, diethylene glycol, diethylene glycol monomethyl ether and -ethyl ether, dipropylene glycol, triethylene glycol, 1,5-pentanediol, glycerol, 2-hydroxyethyl acetate, 2-(2-hydroxyethoxy)-ethyl acetate, 2-hydroxypropionitrile, formamide, dimethylformamide, pyrrolidone, N-methylpyrrolidone, 6-caprolactam, N-methyl-6-caprolactam, urea, tetramethylurea, 1,3-dimethyl-2-imidazolidinone, N,N'-dimethylpropyleneurea, butyrolactone, dimethyl sulphoxide, dimethyl sulphone, sulpholane and polyethylene glycols having a molecular weight of up to 500 daltons.

Further suitable additives which are customary in printing inks are those ionic and nonionic substances which can be used to adjust the viscosity and/or surface tension in the ranges necessary for the application.

The printing inks according to the invention are composed of:

0.5 to 20% by weight of one or more dyestuffs according to the invention, 50 to 99.5% by weight of water, 0 to 30% by weight of one or more organic solvents and/or hydrotropic agents, 0 to 30% by weight of viscosity and/or surface tension modifiers, the sum of the ingredients mentioned adding up to 100% by weight.

The recording fluids according to the invention are stable down to pH values of less than 9.0 and are distinguished by the fact that no precipitates are deposited even on extended storage and that the fine nozzles of recording heads do not become clogged when slight evaporations take place. They are suitable for recording on a variety of recording media without any restrictions with respect to the type of recording media. They are rapidly fixed, form sharp, non-frayed edges and finally give images of high deity and resolution having excellent resistance to water, light fastness and wear resistance.

The formulae given in the examples below only represent a possible structural form of the particular dyestuff according to the invention.

The invention furthermore relates to substrates, in particular paper, coloured with at least one of the dyestuffs according to the invention.

EXAMPLES

Example 1

205 g of a paste of the dyestuff of the formula

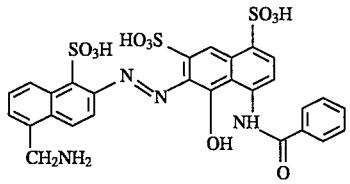

having a dyestuff content of 33.5% are suspended in 500 ml of water and dissolved at a pH of 11.8 by addition of 10% strength NaOH This solution is pumped into an initial charge of 20.3 g of cyanuric chloride in 180 ml of water in such a manner that a pH of 6 is obtained. The pH is maintained at 6 for ether hour using 10% strength NaOH. After heating the mixture to 60° C., 23.1 g of pentaethylenehexamine in 260 ml of water are pumped into the reaction mixture in such a manner that a pH of 7.5 is obtained. The reaction time is about two hours. The mixture is heated to 85° C., and another 92.7 g of pentaethylenehexamine are added. At this temperature, the pH is maintained at 9 for 1 hour using 10% strength NaOH. After cooling, the pH is brought to 7 with dilute HCl, the product is filtered off with suction, washed with water and dried. Yield 96.6 g; $\lambda_{max}$ 519 nm.

Example 2

48.3 g of the dyestuff from Example 1 are suspended in 1,500 ml of water, and the resulting suspension is brought to a pH of 10 with 10% strength NaOH. At 5° C., 5.2 g of succinic anhydride are added, and the pH is maintained at 8.5 with 10% strength NaOH. After 2 hours, the temperature is raised to 60° C. and the pH maintained at 8.5. After cooling, the reaction mixture is filtered. Addition of 9:1 water/pentanediol gives a magenta-coloured ink having good application properties; $\lambda_{max}$ 519 nm.

Example 2 is repeated, replacing succinic anhydride by the following acylating agents:

| Example 3 | $\lambda_{max}$ 519 nm | 5.3 g of acetic anhydride |
| Example 4 | $\lambda_{max}$ 518 nm | 5.1 g of maleic anhydride |
| Example 5 | $\lambda_{max}$ 519 nm | 18.2 g of benzoyl chloride |

Example 6

20 g of cyanuric chloride are suspended at 0° C. in 1,500 ml of water. 192 ml of 10% strength flavonate solution are added dropwise to this slurry over a period of 2 hours in such a manner that the pH is maintained at 2 to 2.5. The batch is warmed to room temperature, and 205 g of a paste of the dyestuff of the formula

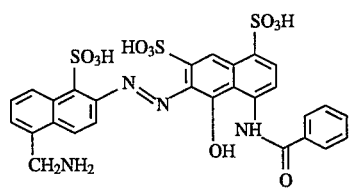

having a dyestuff content of 33.5% are added. The mixture is heated to 60° C. and the pH maintained at 6.5 for 2 hours using 10% strength NaOH. After addition of 30.2 g of pentaethylenehexamine, it is heated to 90° C. and maintained at this temperate for 3 hours. After cooling, the product is salted out with 350 g of NaCl, filtered off with suction, washed with 10% strength NaOH and dried. Yield: 101.3 g; $\lambda_{max}$ 518 nm.

Example 6 is repeated, replacing the flavonate solution by the following substances:

| Ex. 7 | $\lambda_{max}$ 521 nm | 4-(4-Aminobenzoylamino)-aniline-2-sulphonic acid |
| Ex. 8 | $\lambda_{max}$ 519 nm | 7.6 g of 2,5-Diaminobenzoic acid |
| Ex. 9 | $\lambda_{max}$ 519 nm | 15.4 g of N,N'-(4,4'-diamino-3,3'-disulphodiphenyl)urea |

Example 10

50 g of the dyestuff from Example 7 having a dyestuff content of 90% are dissolved in 600 ml of water, and 4 g of succinic anhydride are added at 0° to 5° C. After 30 minutes at 0° to 5° C., the solution is heated to 60° C. and maintained at this temperature for 30 minutes. After cooling, the reaction mixture is filtered.

Addition of 9:1 water/pentanediol gives a magenta-coloured ink having good application properties; $\lambda_{max}$ 520 nm.

Example 10 is repeated, replacing the dyestuff from Example 6 by the following dyestuffs:

| Example 11 | $\lambda_{max}$ 519 nm | 46 g of the dyestuff from Example 7 (90%) |
| Example 12 | $\lambda_{max}$ 519 nm | 40 g of the dyestuff from Example 8 (90%) |
| Example 13 | $\lambda_{max}$ 519 nm | 50 g of the dyestuff from Example 9 (90%) |

Example 14

118 g of a paste of the dyestuff of the formula

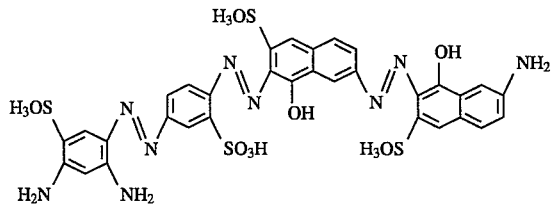

having a dyestuff content of 75% are suspended in 350 ml of water, and the resulting suspension is brought to a pH of 6 by addition of dilute HCl. 21.4 g of cyanuric chloride are suspended in 300 g of ice and 300 ml of water, and the resulting suspension is added. The pH is maintained at 6 with 5% strength NaOH. The temperature rises to room temperature within 1 hour and is maintained there for ether 3 hours. After addition of 53.6 g of aminoethylpiperazine, the mixture is heated to 80° C. and stirred at this temperature for 3 hours. After cooling, the pH is brought to 8, and the product is filtered off with suction and dried. Yield 115 g; $\lambda_{max}$ 576 nm. The dyestuff obtained could possibly have the following formula:

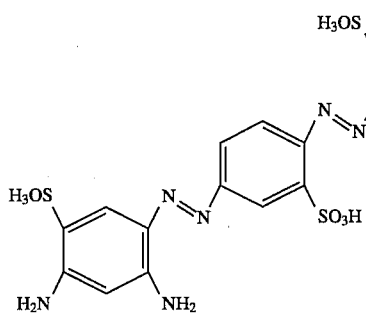
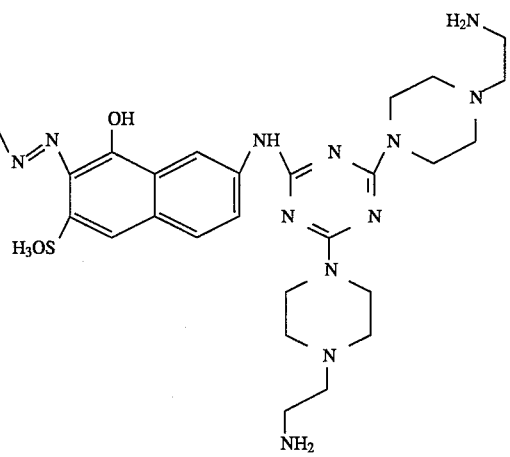

Example 14 is repeated, using the following dyestuffs:

Ex. 15
λ_max
588 nm
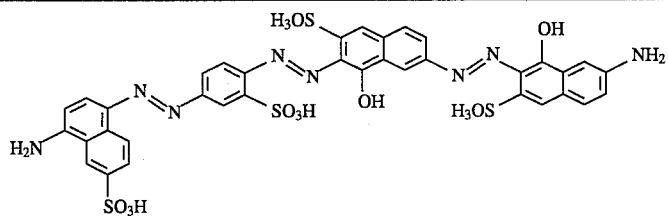

Ex. 16
λ_max
580 nm
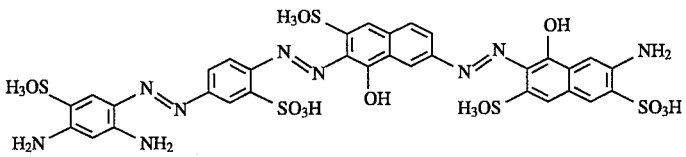

Ex. 17
λ_max
595 nm
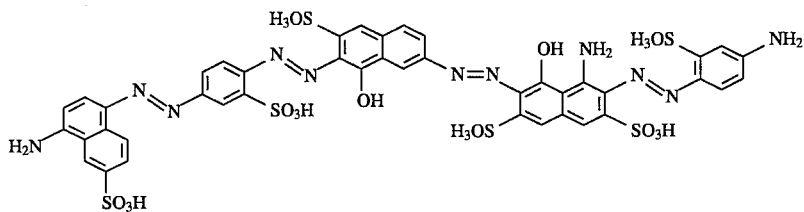

Example 18

81 g of the dyestuff from Example 14 having a dyestuff content of 75% are suspended in 1 l of water, and the resulting suspension is brought to a pH of 10 with 5% strength NaOH. 5.1 g of succinic anhydride are added at 0° to 5° C., and the pH is maintained at 8.5 with 5% strength NaOH. After 2 hours at 0° to 5° C., the mixture is warmed to room temperature, additionally stirred for 2 hours and filtered.

Addition of 9:1 water/pentanediol gives a black ink having good application properties; $\lambda_{max}$ 576 nm.

Possible structure:

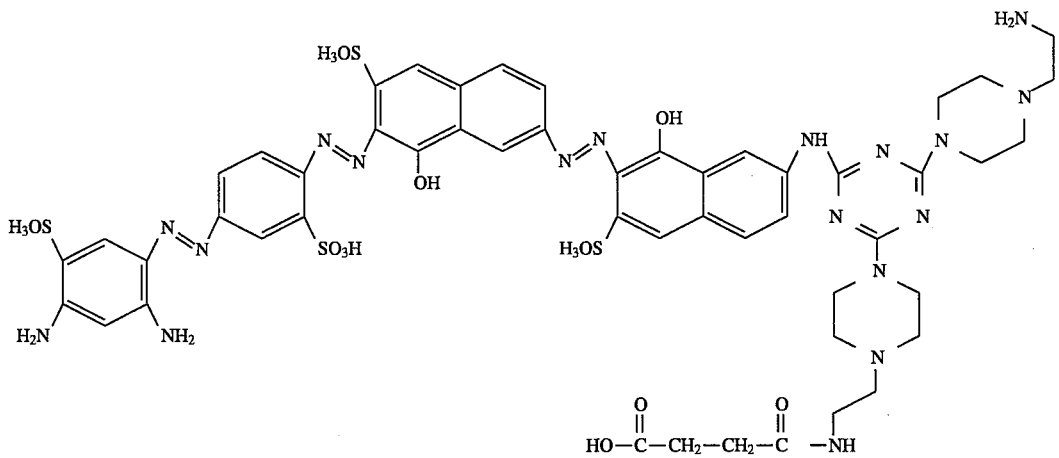

Example 18 is repeated, replacing the dyestuff from Example 14 by the following dyestuffs:

| Example 19 | $\lambda_{max}$ 520 nm. | 63 g of the dyestuff from Example 16 (90%) |
|---|---|---|
| Example 20 | $\lambda_{max}$ 520 nm. | 76 g of the dyestuff from Example 17 (85%) |
| Example 21 | $\lambda_{max}$ 520 nm. | 74 g of the dyestuff from Example 18 (90%) |

Example 22

39.2 g of 8-amino-1-naphthol-3,6-disulphonic acid having a content of 81.3% are stirred in 150 ml of water and dissolved by addition of 42 ml of 5N sodium hydroxide solution. This solution is poured at 0° to 3° C. onto a suspension of 19.2 g of cyanuric chloride in 150 ml of ice water over a period of 75 minutes in such a manner that the pH does not rise above 5.2. The mixture is first additionally stirred at 0° to 3° C. for another 40 minutes. While maintaining the pH at 5.0 to 5.2, the temperature is allowed to rise to room temperature and stirring is continued for a few hours until the pH remains constant and about 42 ml of 5N sodium hydroxide solution have been consumed.

After reaction is complete, the precipitated condensation product is filtered off with suction and dissolved in water and reprecipitated with a small amount of sodium chloride.

This gives a chromatographically uniform reaction product which is coupled in a volume of about 1.5 l at a pH of 8.5 and a temperature of 5° to 10° C. with the diazonium salt of 2-aminonaphthaline-1,5-disulphonic acid prepared in the usual manner. The next morning, 8 g of a commercially available clarifying agent are added to the deep-red dyestuff solution, and the solid material iS filtered off after 1 hour of stirring. For further purification, the filtrate is treated on a laboratory ultrafiltration unit by passing it through a semipermeable membrane having a cut-off point of 15,000 daltons. This treatment reduces the volume first to 1,000 ml and, after replenishing with one liter of water, concentrates it again to 1,000 ml. The remaining sodium chloride content of this solution is now only 0.31% by weight.

22 g of pentaethylenehexamine are now added to the low-salt concentrate, and the mixture is heated to 80° C. After one hour of stirring at 80° C., no more starting compound can be detected in the thin-layer chromatogram.

The solution is then cooled to 10° C. by dipping into an ice bath, and 10 g of succinic anhydride are added. The temperature is allowed to rise to room temperature, the pH is maintained at 8.5 to 9.0 with dropwise addition of a total of 22 ml of 5N sodium hydroxide solution and the mixture is stirred at room temperature until no more sodium hydroxide solution is consumed.

After reaction is complete a 15.2% strength solution of the dyestuff according to the invention is present.

Possible structure:

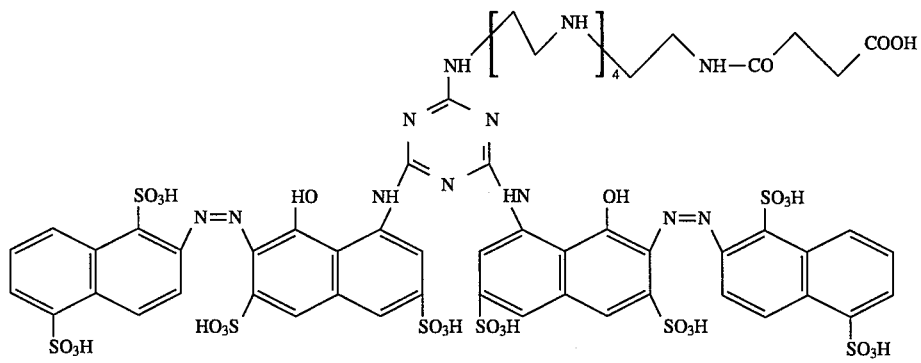

The $\lambda_{max}$ value is 516 nm. The solution dyes polyamide fibres, wool and leather by the customary exhaust methods in lightfast red hues. Diluting the solution with a 9:1 water/1,5-pentanediol mixture gives a valuable recording fluid which can be used to produce wetfast ink-jet prints in lightfast magenta hues on customary writing papers.

Example 22 is repeated, replacing the 10 g of succinic anhydride by the following substances in the following amounts:

| Example 23 | 10 g of acetic anhydride |
| Example 24 | 20 g of acetic anhydride |
| Example 25 | 14.8 g of phthalic anhydride |
| Example 26 | 14 g of benzoyl chloride |
| Example 27 | 28 g of benzoyl chloride |
| Example 29 | 11 g of ethyl chloroformate |
| Example 30 | 12 g of phenyl isocyanate |

Example 31

301.5 g of a paste of the dyestuff of the formula

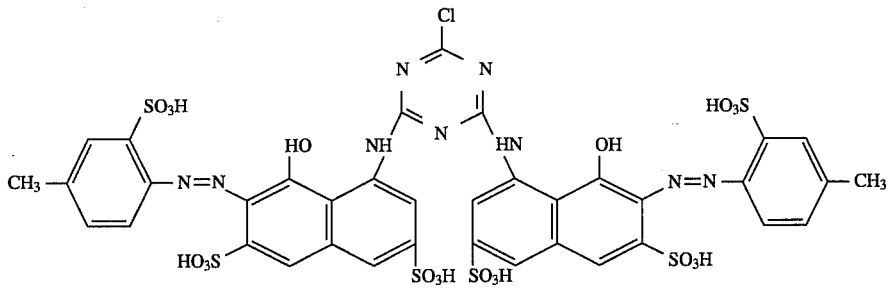

having a dyestuff content of 38.0% are suspended in ml of water and dissolved at a pH of 9.0 by dropwise addition of 5N sodium hydroxide solution. 61.9 g of a 50% strength aqueous standardization of polyethyleneimine having an average molecular weight of 1,5000 daltons are added to the solution, and the mixture is stirred at 80° C. until no more starting dyestuff can be detected in the thin-layer chromatogram.

The solution is allowed to cool to room temperature, 14 g of benzoyl chloride are added dropwise over a period of one hour while maintaining the pH at 8.5 using a total of 24 ml of 5N sodium hydroxide solution. After reaction is complete, the dyestuff according to the invention is precipitated by addition of 2N hydrochloric acid.

Possible structure:

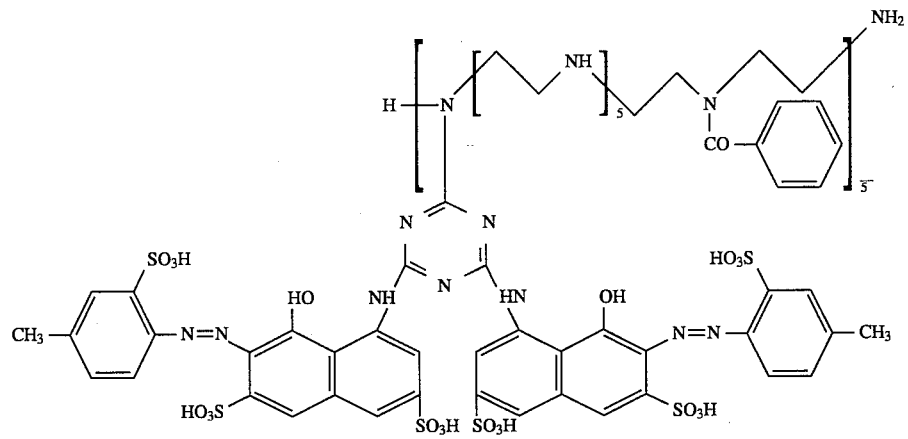

It is filtered off with suction, washed with water and dried at 60° C. under reduced pressure. This gives 173 g of a red powder which upon addition of dilute sodium hydroxide solution is readily soluble in water ($\lambda_{max}$ 514 nm). Stirring such a solution with 1% by weight of a clarifying agent for one hour, filtering the solution and adjusting the concentration of the filtrate with 9:1 water/1,5-pentanediol gives a magenta-coloured ink having good application properties.

Example 31 is repeated, replacing the 14 g of benzoyl chloride by the following substances in the following amounts:

| | |
|---|---|
| Example 32 | 28 g of benzoyl chloride |
| Example 33 | 10 g of acetic anhydride |
| Example 34 | 20 g of acetic anhydride |
| Example 35 | 14 g of ethoxyacetyl chloride |

Example 36

30 g of 93.5% pure polyallylamine hydrochloride having an average molecular weight of 9,250 daltons are stirred in 1,800 ml of water, and about 60 ml of 5N sodium hydroxide solution are added dropwise until a pH of 9.5 is reached. 72.5 g of the dyestuff of the formula

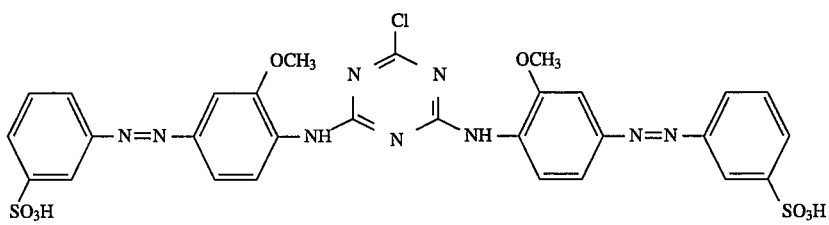

are introduced into this solution in the fore of a moist paste, and the entire batch is stirred first at room temperature for two hours and then at 70° C. for two hours while maintaining a pH of 9.0. After reaction is complete, the batch is permeated under pressure through a semi-permeable membrane having a cut-off point of 3,000 daltons and concentrated to a volume of 1 liter. This gives a low-salt, approximately 8.6% strength by weight solution of the dyestuff according to the invention.

Possible structure:

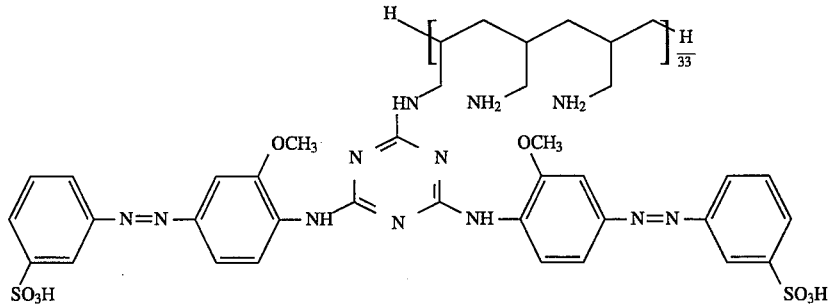

Diluting the solution with 2,100 ml of water and 350 ml of diethylene glycol gives a yellow ($\lambda_{max}$=400 nm) recording fluid having good ink-jet printing properties.

Example 37

70 g of 93.5% pure polyallylamine hydrochloride having an average molecular weight of 9,250 daltons are dissolved in 2,000 ml of water, and 140 ml of 5N sodium hydroxide solution are added. 394 g of a paste of the dyestuff of the formula

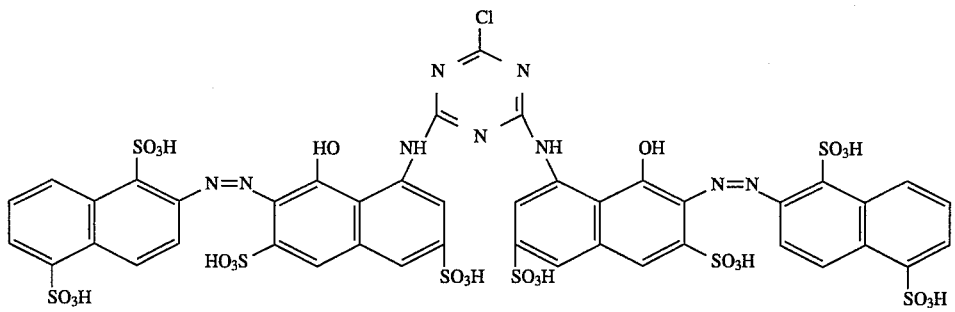

having a dyestuff content of 35.0% are introduced over a period of one hour while not allowing the pH to drop below 9.0 by dropwise addition of 5N sodium hydroxide solution. The mixture is heated to 70° C. and stirred at pH 9.0 and 70° C. for two hours. The solution is then aftertreated in a laboratory ultrafiltration unit to give a low-salt solution of the dyestuff according to the invention.

The temperature is allowed to rise to room temperature and stirring at pH 8.5 to 9.0 is continued until no more sodium hydroxide solution is consumed for maintaining the pH.

Afer reaction is complete, a solution of the dyestuff according to the invention is present.

Possible structure:

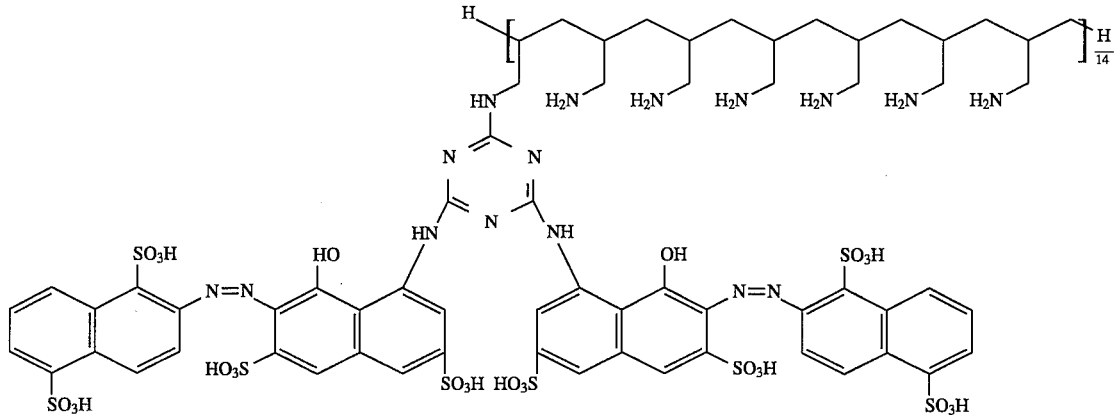

Magenta-coloured inks ($\lambda_{max}$=539 nm) having good application properties can be prepared from this solution.

Example 38

10 g of succinic anhydride are added at 10° C. to 887 ml of a 10% strength by weight dyestuff solution prepared by the procedure of Example 37 while cooling in an ice bath.

Possible structure:

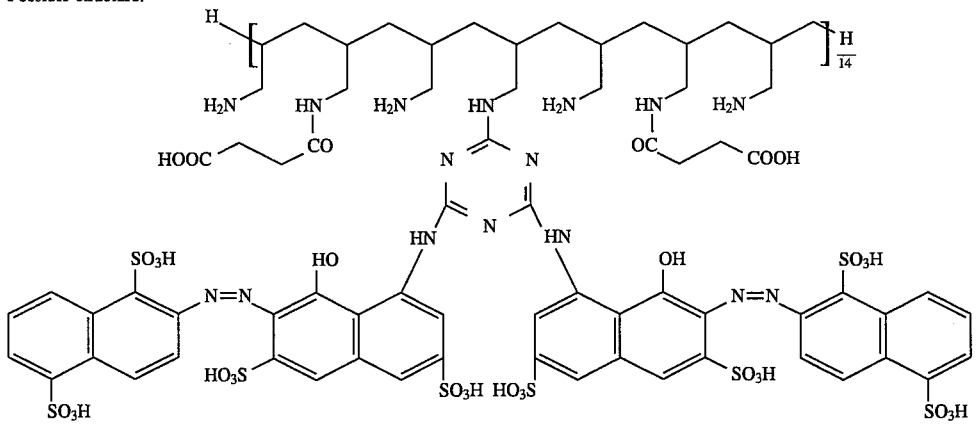

Dilution with water and simultaneous addition of 10% by weight of 1,5-pentanediol gives a valuable magenta-coloured recording fluid having good application properties.

Example 38 is repeated, replacing the 10 g of succinic anhydride by the following substances in the following amounts.

| Example 39 | 5 g of succinic anhydride |
|---|---|
| Example 40 | 7 g of benzoyl chloride |
| Example 41 | 14 g of benzoyl chloride |

We claim:
1. Dyestuffs obtainable by reacting all of A, B, C and D, which comprises
   A) polyamines containing at least 2 primary or secondary amino groups with
   B) reactive compounds containing at least two groups which are reactive towards primary and secondary amines in an amount of 5 to 95 mol %, relative to the primary and secondary amino groups of the
   C) dyestuffs containing at least one acylatable primary or secondary amino group in an amount of 10 to 200 mol %, relative to the reactive compound, and
   D) carbonyl- or sulphonyl-containing acylating agents in an amount of 5 to 95 mol %, relative to the primary and secondary amino groups of the polyamine.

2. Dyestuffs according to claim 1, obtainable by using, as polyamines A), those of the formula (I)

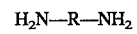

in which
$R_1$ is linear or branched $C_2$–$C_{20}$-alkylene, unsubstituted or $C_1$–$C_4$-alkyl-substituted $C_6$–$C_{10}$-arylene, 2 or more $C_6$–$C_{10}$-arylene units which are unsubstituted or substituted by $C_1$–$C_4$-alkyl and may be interrupted by $C_1$–$C_4$-alkylene, n linear or branched $C_2$–$C_{20}$-aliphatic units interrupted by (n-1) amino groups where n is 2 to 25,000, it being possible for the radicals given as meanings for $R_1$ to contain amino groups, $R_2$ and $R_3$, independently of one another, are hydrogen, $C_1$–$C_{10}$-alkyl, $C_6$–$C_{10}$-aryl or together form a $C_2$–$C_{10}$-alkylene or $C_6$–$C_{10}$-arylene unit.

3. Dyestuffs according to claim 1, obtainable by using at least one of the polyamines below:
a) diamines of the formula (II)

$$H_2N\text{—}R\text{—}NH_2 \qquad (II),$$

in which
R represents $C_2$–$C_9$-alkylene or a divalent radical of the formula

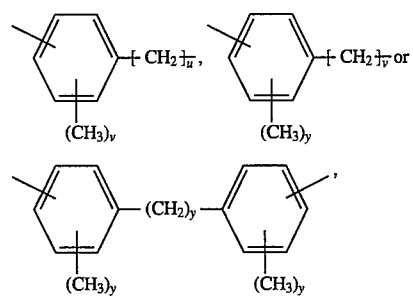

in which
u represents 1 or 2,
v represents 0 or 1 and
y represents 1, 2 or 3 b) piperazines of the formula

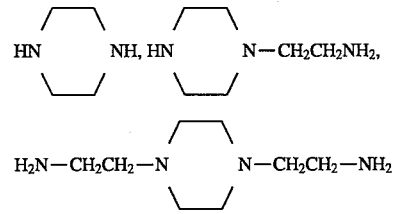

c) polyamines of the formula (III)

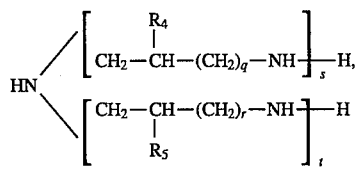

in which
$R_4$, $R_5$, independently of one ether, represent hydrogen, methyl or ethyl, q, r, independently of one another, represent 0, 1, 2, 3 or 4 and s, t, independently of one another, represent 1, 2, 3, 4, 5 or 6, d) polyamines obtainable by polymerization of $C_2-C_{10}$-alkyleneimines, e) polyamines obtainable by polymerization of unsaturated aliphatic $C_3-C_{10}$-amines in which the amino group is in the allyl position or aromatic $C_6-C_{10}$-amines carrying unsaturated aliphatic radicals whose double bond is conjugated with the aromatic system, f) polyamines obtainable by the condensation of polyamines of the formula (III) with aliphatic $C_2-C_{10}$-dihalides.

4. Dyestuffs according to claim 1, obtained by using, as the dyestuffs C), phthalocyanine, nitroaryl, triphenylmethane, oxazine, triphendioxazine, phenazine, stilbene, thiazine, xanthene, anthraquinone, monoazo, disazo and polyazo dyestuffs and metal complex dyestuffs.

5. Dyestuffs according to claim 1, obtainable by using reactive compounds B) which, independently of one another are derived at least from one aliphatic, araliphatic, aromatic or heteroaromatic reactive group.

6. Dyestuffs according to claim 1, obtainable by using reactive compounds B) which, independently of one another, contain at least one of the following radicals:

$-SO_2-A$, $-CO-A$, $-SO_2-CH=CH_2$, $-SO_2-CH_2CH_2-A$, $-CO-CH_2CH_2A$, $-CONH-CH_2-A$, $-SO_2NH-CH_2CH_2-A$, $-NHCO-CH_2CH_2-A$, $-CH_2-CH(OH)-CH_2-A$, 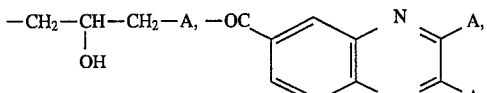

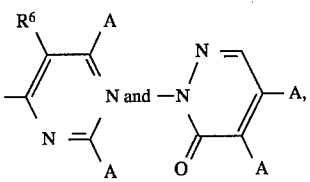

where $R_6$ is H, Cl, $CH_3$, or CN, and

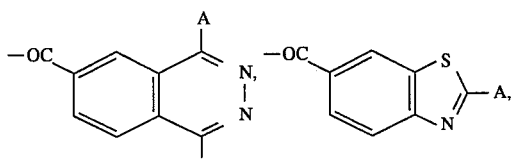

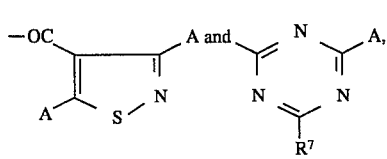

where $R^7$ is $NH_2$, 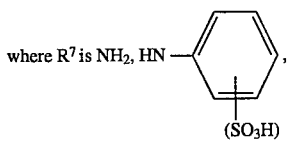

$OCH_3$ or $OCH_2CH_2OCH_3$, and

A is Cl, F, $OSO_3H$, $N(CH_3)_3$, $SO_2CH_3$, $OPO_3H$ or $SO_2C_2H_5$.

7. Dyestuffs according to claim 1, wherein the reactive compound B) halogenotriazine.

8. Dyestuffs according to claim 1, wherein the reactive compound B) and the dyestuff C) together are represented by a reactive dyestuff containing at least one group which is reactive towards primary and secondary amines.

9. Dyestuffs according to claim 1, obtainable by using, as the carbonyl- or sulphonyl-containing acylating agent, carbonyl halides, carboxylic esters or anhydrides, halogenoformates, isocyanates or sulphonyl halides, sulphonic esters or isothiocyanates.

10. Dyestuffs obtainable by reacting

A1) polyamines which in turn are obtainable by polymerization of unsaturated aliphatic $C_3-C_{10}$-amines in which the amino group is in the allyl position, or aromatic amines carrying unsaturated aliphatic radicals which are conjugated with the aromatic system, in particular methyl-, ethyl- or propylaminoethylstyrene or aminostyrene, with B) reactive compounds containing at least two groups which are reactive towards primary and secondary amines in an amount of 5 to 95 mol%, relative to the primary and secondary amino groups of the polyamine, and C) dyestuffs containing at least one acylatable primary or secondary amino group in an amount of 10 to 200 mol %, relative to the reactive compound, in which dyestuff C) is in each case bonded to the reactive compound B).

11. Printing inks containing at least one dyestuff according to claim 1.

12. Printing inks containing 0.5 to 20% by weight of one or more dyestuffs according to claim 1, 50 to 99.5% by weight of water, 0 to 30% by weight of one or more organic solvents, and 0 to 30% by weight of at least one of viscosity and surface tension modifiers, the sum of the ingredients adding up to 100%.

13. Substrates coloured or printed with at least one dyestuff of claim 1.

14. Dyestuffs according to claim 1, obtainable by using as the dyestuffs C) anthraquinone, monoazo, disazo and polyazodyestuffs, or 1:1 nickel complexes, 1:1 copper complexes or 1:1 chromium complexes, 1:2 cobalt complexes or symmetrical or unsymmetrical 1:2 chromium complexes containing a metal-complexing o,o'-dihydroxy-, o-hydroxy-o'-amino- or o-carboxy-o'-hydroxy-azo- or -azomethine structure.

15. Dyestuffs according to claim 1, wherein the reactive compound A) is cyanuric fluoride, cyanuric chloride or cyanuric bromide.

16. In the production of an ink-jet recording system utilizing a recording fluid, the improvement wherein said recording fluid comprises a printing ink according to claim 1.

* * * * *

UNITED STATES PATENT AND TRADEMARK OFFICE
CERTIFICATE OF CORRECTION

PATENT NO. : 5,503,666
DATED : April 2, 1996
INVENTOR(S) : Mennicke, et al.

It is certified that error appears in the above-indentified patent and that said Letters Patent is hereby corrected as shown below:

Col. 23, line 40    After " groups of the " insert
                    -- polyamine, and --

Signed and Sealed this

Twentieth Day of August, 1996

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,503,666
DATED : April 2, 1996
INVENTOR(S) : Mennicke, et al.

It is certified that error appears in the above-indentified patent and that said Letters Patent is hereby corrected as shown below:

| | |
|---|---|
| Col. 8, line 25 | Delete " can-be " and substitute -- can be -- |
| Col. 8, line 26 | Delete " and no " and substitute -- amino -- |
| Col. 10, line 59 | Delete " deity " and substitute -- density -- |
| Col. 17, line 36 | After " in " insert -- 750 -- |
| Col. 19, line 27 | Delete " fore " and substitute -- form -- |

UNITED STATES PATENT AND TRADEMARK OFFICE
CERTIFICATE OF CORRECTION

PATENT NO. : 5,503,666
DATED : April 2, 1996
INVENTOR(S) : Mennicke, et al.

It is certified that error appears in the above-indentified patent and that said Letters Patent is hereby corrected as shown below:

Col. 26, line 4    After " B) " insert -- represents --

Col. 26, line 26   Delete " a "

Col. 26, line 27   Delete " mines " and substitute -- amines --

Col. 26, claim 15 line 2   Delete " A) " and substitute -- B) --

Signed and Sealed this

Twenty-sixth Day of November 1996

Attest:

BRUCE LEHMAN

Attesting Officer          Commissioner of Patents and Trademarks